Dec. 17, 1940.                H. C. KEITH                 2,225,522
                              DUMP TRAILER
                          Filed July 5, 1940              2 Sheets-Sheet 2
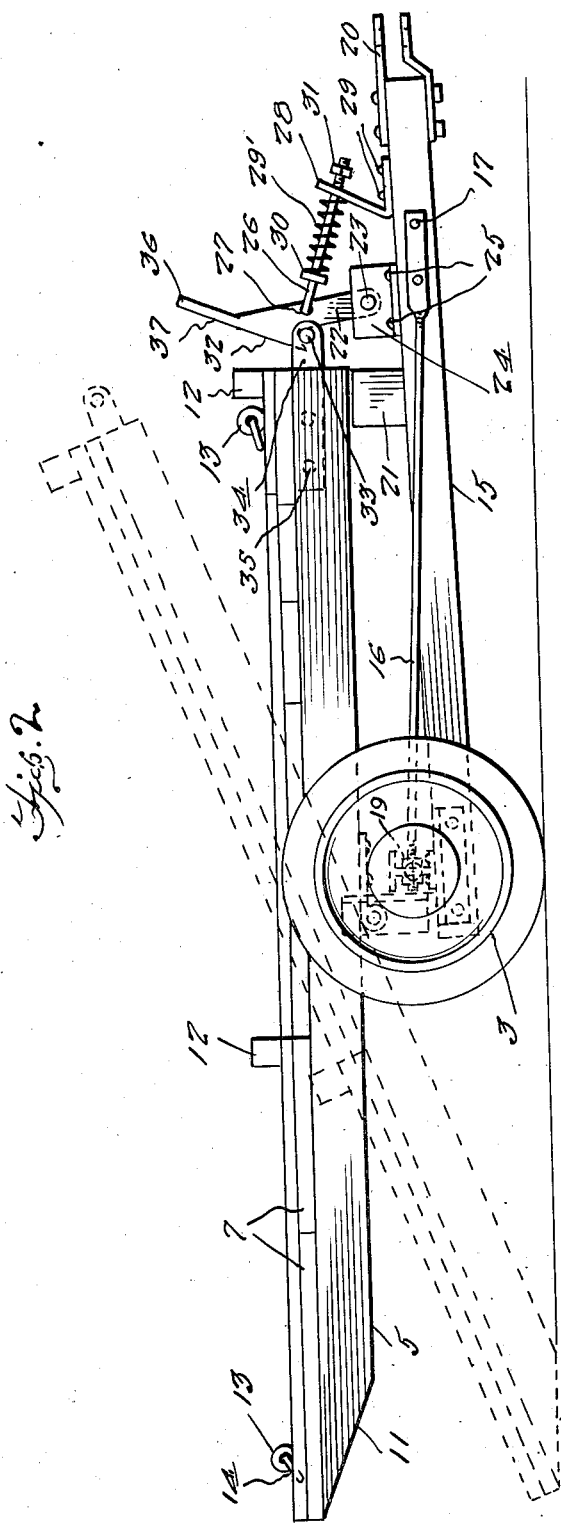
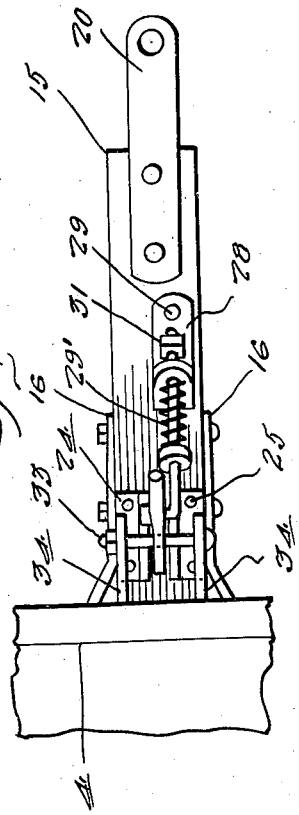
Inventor
HENRY C. KEITH
By Clarence A. O'Brien
Attorney Patented Dec. 17, 1940

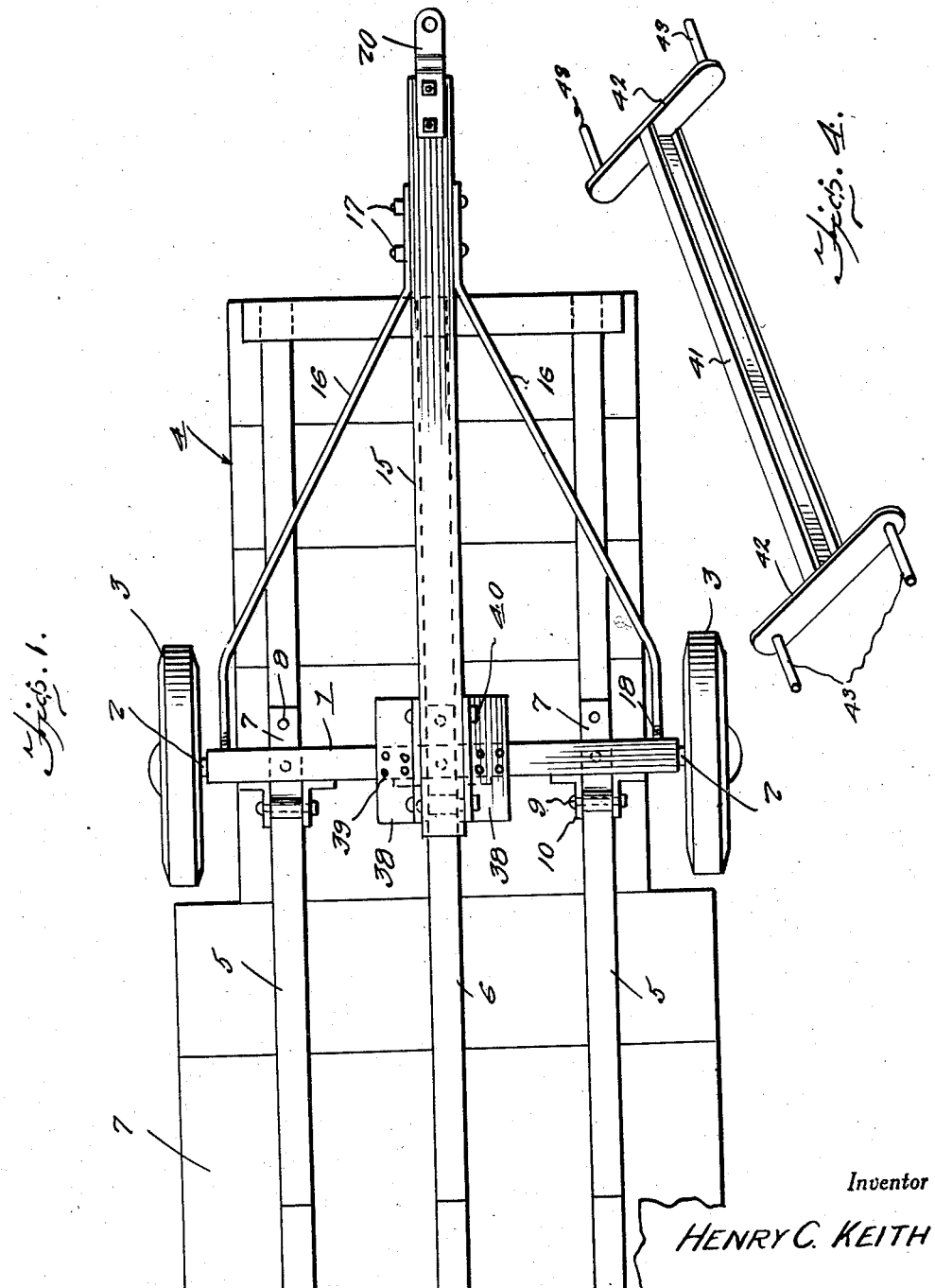

2,225,522

UNITED STATES PATENT OFFICE 2,225,522

DUMP TRAILER

Henry C. Keith, Markham, Tex., assignor of forty-nine per cent to Rufus M. Keith, Bay City, Tex.

Application July 5, 1940, Serial No. 344,178

1 Claim. (Cl. 298—5)

My invention relates to improvements in dump trailer and the principal object in view is to provide a simply constructed, inexpensive, sturdy trailer with a low center of gravity upon which heavy vehicles such as tractors and the like may be easily loaded for transportation on the road.

To the accomplishment of the above, and subordinate objects presently appearing, a preferred embodiment of my invention has been illustrated in the accompanying drawings, set forth in detail in the succeeding description and described in the claim appended hereto.

In said drawings:

Figure 1 is a view in bottom plan of the preferred embodiment of my invention.

Figure 2 is a view in side elevation.

Figure 3 is a fragmentary detail view in top plan drawn to an enlarged scale, and Figure 4 is a view in perspective of a modification of the axle bar.

Referring to the drawings by numerals, my improved dump trailer comprises, as its basic element, an axle bar 1, preferably in the form of a channel iron beam, provided on the ends thereof with stub axles 2 upon which are small diameter ground wheels 3 preferably rubber tired.

The axle bar 1 supports a flat bed 4 of elongated form disposed lengthwise across said bar and comprising a pair of longitudinally extending side bars 5 and a center bar 6 with cross planks 7 suitably secured thereon. The beams 5, 6, are hinged substantially midway of their ends to the axle bar 1 so that said bed 4 dumps rearwardly and downwardly. The hinges comprise spring leaves 7 suitably secured, as at 8, to the under side of said beams 5, 6, and pivoted, as at 9, between pairs of hinge bars 10, secured to the rear side of the axle bar 1. The pivotal axis of the hinges described is close to the axle bar 1 to contribute to a low center of gravity arrangement in the trailer as will be clear. The bed 4 is of increased width in the rear of the wheels 3 so that the bed is overbalanced to dump rearwardly and downwardly, and the beams 5, 6, are beveled, as at 11, at their rear ends to abut the ground flush when the bed is dumped so as to facilitate driving a tractor, or the like, up said bed when dumped. Chock blocks 12 are provided at suitable corners of the bed 4 on top thereof for preventing a tractor, or other vehicle, from overrunning the bed 4 when driven thereon. Eye-bolts 13 with rings 14 therein are also provided on the bed 4 for use in anchoring a tractor on said bed.

An underslung draft tongue 15 extends forwardly from beneath the axle bar 4 braced by a pair of reach rods 16 secured thereto on opposite sides thereof, as at 17, and having rear ends threaded, as at 18, and extended through axle bar 1 with nuts 19 turned thereon. The front end of the tongue 15 is provided with a suitable clevis type hitch 20. An abutment block 21 on the tongue 15, under the front end of the bed 4, establishes the normal position of said bed.

An upstanding latch bar 22 is pivoted at its lower end, as at 23, to a pair of brackets 24 bolted to the top of the tongue 15, as at 25, the arrangement being such that said bar is swingable rearwardly and forwardly into and from latching position. The latch bar 22 is urged rearwardly toward latching position by means of a rod 26 having a rear end pivoted to said bar, as at 27, and a front end slidably mounted in a bracket 28 bolted to the top of the tongue 15 as at 29. A coil spring 29' surrounding the rod between said brackets 28 and a collar 30 on said rod urges the rod and hence the latch bar 22 rearwardly into latching position. A nut 31 threaded onto the front end of the rod 26 to abut the bracket 28 limits rearward movement of said rod. The latch bar 22 is provided on the rear edge thereof with a down-turned beak 32 adapted to hook over a cross-bolt 33 extending between a pair of bars 34 projecting forwardly from the bed 4 and bolted, as at 35, to opposite sides of the center bar 6. The upper end of the latch bar 22 is formed with an upstanding hand grip 36 by means of which said bar may be swung forwardly to unlatching position in which the beak 32 releases the bolt 33 and the bed 4 is free to dump under the influence of gravity. As best shown in Figure 2, the beak 32 and hand grip 36 form a rearwardly and downwardly inclined cam 37 on the latch bar 22 adapted to be engaged by the bolt 33 with a wiping action under downward movement of the front end of the bed 4, whereby said latch bar 22 is cammed forwardly to hook over said bolt with a snap action under the urge of the spring 29'.

Any suitable means may be provided for securing the tongue 15 to the axle bar 1, as for instance, a pair of cheek plates 38 bolted to the under side of the axle bar as at 39 and to the tongue as at 40.

As will be manifest, in the dumped position of the bed 4, shown in dotted lines in Figure 2, a tractor, or other vehicle, may be driven up the bed 4 until it overbalances the front end of the bed, whereupon said bed will gravitate to normal position. As the front end of the bed 4 descends, the bolt 33 coacts with cam 37, in the manner already described, so that when the bed reaches normal position, the beak 32 hooks over the bolt 33 under the influence of the spring 29' with a snap action and said bed is latched against dumping. To unlatch the bed it is merely necessary to grasp the hand-grip 36 and pull the latch bar 22 forwardly to unlatching position already described.

In Figure 4 I have shown a modified form of axle bar 41 for converting the trailer into a four wheeled vehicle, said bar embodying a pair of cross bars 42 at opposite ends thereof, respectively, each carrying a pair of stub axles 43 for the mounting of ground wheels, not shown, thereon. The axle bar 41 may be attached in the same manner as bar 1 as will be clear.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claim.

What I claim is:

A dump truck comprising a wheel supported axle bar, a flat bed of elongated form including a pair of subjacent side beams and a center beam extending crosswise of said bar, hinges connecting the side beams intermediate the ends thereof to said bar whereby the bed is vertically swingable on said bar into and from rearwardly dumped position, said bed fitting between said wheels and said hinges being attached to the rear side of said bar to lower the center of gravity of said bed, and said bed having a widened tail end portion for counterbalancing the same to cause automatic dumping of the bed, an underslung tongue fixed to said bar centrally of the bar to extend forwardly beyond the bed, a transverse bumper bar on said tongue beneath the front ends of said beams for supporting the front end of the bed, and coacting devices on said tongue and front end of the bed for locking the bed down against said bumper bar.

HENRY C. KEITH.